United States Patent
Lakemond et al.

(10) Patent No.: US 11,574,387 B2
(45) Date of Patent: Feb. 7, 2023

(54) LUMINANCE-NORMALISED COLOUR SPACES

(71) Applicant: Imagination Technologies Limited, Kings Langley (GB)

(72) Inventors: Ruan Lakemond, Cheltenham (AU); Fabian Angarita, Alicante (ES)

(73) Assignee: Imagination Technologies Limited, Kings Langley (GB)

( * ) Notice: Subject to any disclaimer, the term of this patent is extended or adjusted under 35 U.S.C. 154(b) by 591 days.

(21) Appl. No.: 16/118,927

(22) Filed: Aug. 31, 2018

(65) Prior Publication Data

US 2019/0068841 A1    Feb. 28, 2019

(30) Foreign Application Priority Data

Aug. 31, 2017 (GB) .................................... 1713979

(51) Int. Cl.
   *G06T 5/00* (2006.01)
   *H04N 1/56* (2006.01)

(52) U.S. Cl.
   CPC .............. *G06T 5/00* (2013.01); *H04N 1/56* (2013.01); *G06T 2207/20024* (2013.01)

(58) Field of Classification Search
   None
   See application file for complete search history.

(56) References Cited

U.S. PATENT DOCUMENTS

| | | | | |
|---|---|---|---|---|
| 5,247,366 A | * | 9/1993 | Ginosar | H04N 5/235 348/242 |
| 5,543,820 A | * | 8/1996 | Edgar | G09G 5/02 345/589 |
| 8,411,206 B2 | * | 4/2013 | Pettitt | H04N 9/69 348/661 |
| 2004/0085458 A1 | * | 5/2004 | Yanof | H04N 9/045 348/223.1 |
| 2005/0238227 A1 | * | 10/2005 | Takahashi | H04N 1/608 382/162 |
| 2013/0335438 A1 | * | 12/2013 | Ward | G06T 5/40 345/589 |

FOREIGN PATENT DOCUMENTS

| | | |
|---|---|---|
| CN | 101866497 A | 10/2010 |
| CN | 107113367 A | 8/2017 |
| EP | 1903775 A1 | 3/2008 |
| KR | 20120124782 A | 11/2012 |

(Continued)

OTHER PUBLICATIONS

Lucchese L et al; "A New Class of Chromatic Filters for Color Image Processing. Theory and Applications"; IEEE Transactions on Image Processing; vol. 13; No. 4; Apr. 1, 2004; pp. 534-548.

(Continued)

*Primary Examiner* — Tahmina N Ansari
(74) *Attorney, Agent, or Firm* — Potomac Law Group, PLLC; Vincent M. DeLuca

(57) ABSTRACT

A method of processing image data for an image, the image data including colour data expressed in a first colour space, transforms the colour data to a luminance-normalised colour space, and performs one or more image processing operations on the transformed colour data to generate processed image data.

19 Claims, 10 Drawing Sheets

(56) References Cited

FOREIGN PATENT DOCUMENTS

| KR | 20130126026 A | | 11/2013 |
|---|---|---|---|
| KR | 20160002517 A | | 1/2016 |
| KR | 101685419 B1 | * | 12/2016 |

OTHER PUBLICATIONS

Munkberg et al; "High Dynamic Range Texture Compression for Graphics Hardware"; ACM Transactions on Graphics; vol. 25; No. 3; Jul. 1, 2006; pp. 698-706.

ITU: "Recommendation ITU-R BT.2020-2 Parameter Values for Ultra-High Definition Television Systems for Production and International Programme Exchange BT Series Broadcasting Service (Television)"; Oct. 23, 2015; URL:https://www.itu.int/dms_pubrec/itu-r/rec/bt/R-REC-BT.2020-2-201510-I!!PDF-E.pdf; 8 pages.

Pratt; "Chapter 3: Photometry and Colorimetry"; In: "Digital image processing : PIKS Scientific inside"; Retrieved from http://ebookcentral.proquest.com; Feb. 3, 2007; Wiley-Interscience, Hoboken; pp. 45-88.

* cited by examiner

FIGURE 1 (BACKGROUND)

LUMINANCE-NORMALISED COLOUR SPACES

TECHNICAL FIELD

This invention relates to an apparatus and method for processing colour data for an image.

BACKGROUND

Digital images can be represented using colour data describing the colours of the image. The data may take the form of a set of colour values, where each colour value is used to specify a colour for a region of the image. In order to display the image on a screen, colour values may need to be determined for each pixel forming the image. However, in some circumstances (e.g. for storage or transmission of the image data), the colour data may be compressed so that colour values are stored for larger regions of the image (e.g. blocks of pixels). Thus, the colour data may contain colour values for regions of the image such as pixels, blocks etc.

The mapping between a colour value and the colour it represents is governed by the colour space in which the colour value is expressed. Example colour spaces include RGB, YUV, YCbCr etc. Thus, for example, a colour value expressed in RGB colour space contains a red component, a green component and a blue component; a colour value expressed in YCbCr contains a luminance component (Y), and two chrominance components (Cb and Cr).

A schematic illustration of the relationship between the RGB colour space and the YCbCr colour space is shown in FIG. 1. The range of possible colours that can be represented in the RGB colour space, referred to as the RGB gamut, is shown at 102. It can be seen with reference to FIG. 1 that a single colour can be represented by different colour values if the colour is described using different colour spaces. For example, colour value 104 may have different colour values when expressed in RGB colour space compared to when the colour is expressed in YCbCr space.

During digital image processing, the colour values describing the colours of the image may be manipulated depending on the type of processing operation being performed. Example processing operations include changing the luminance of the image (e.g. in a linear operation or non-linear operation such as Gamma correction) or filtering the image. A difficulty with digital image processing is that the manipulation of colour values to achieve a desired affect can sometimes lead to unwanted colour distortions.

For instance, changing the luminance values can lead to a loss of colour saturation when the colour data is expressed in certain colour spaces, such as RGB and YCbCr. Referring to FIG. 1, for example, it will be appreciated that altering the luminance value Y causes the colour value (e.g. value 104) to move within the RGB colour space, potentially altering the colour for the corresponding region of the image.

Distortions may also arise from filtering an image. One type of filter used to filter images is a median filter. In one example of median filtering, a window is moved pixel-by-pixel through an image, with the value of the pixel being replaced with the median value of the pixels within the window. Applying a median filter to the R, G and B channels of an RGB image (i.e. an image having colour data expressed in RGB space) can lead to a large loss of the brightness information in the image. This is because the RGB colour space does not provide a way to separate the brightness of an image from its chrominance. Applying a median filter to the chrominance channels of a YCbCr image enables the brightness information to be preserved, but may result in darker colours of the image becoming oversaturated and lighter colours being under-saturated.

Certain colour spaces do enable the colour saturation of an image to be preserved during changes of the luminance. Examples of such colour spaces include HSL (hue, saturation, luminance), and HSV (hue, saturation, value). However, these colour spaces express colour values in polar coordinates. This can make filtering operations difficult, typically involving a conversion to a rectilinear colour space (such as RGB).

SUMMARY OF INVENTION

According to the present disclosure there is provided a method of processing image data for an image in an image processor, the method comprising: receiving the image data, wherein the image data comprises colour data expressed in a first colour space; transforming the colour data to a luminance-normalised colour space; and performing one or more image processing operations on the transformed colour data to generate processed image data.

The method may further comprise transforming the processed image data to the first colour space.

The luminance-normalised colour space may be a luminance-normalised luminance-chrominance colour space.

The luminance-normalised luminance-chrominance colour space may comprise: a luminance component, a first luminance-normalised chrominance component and a second luminance-normalised chrominance component.

The chrominance components may be dependent on the luminance.

The luminance-normalised luminance-chrominance colour space may be a luminance-normalised version of a YCbCr colour space.

The luminance-normalised colour space may have components:

$$Y = K_R R + K_g G + K_B B;$$

$$\widetilde{Cr} = \frac{R - Y}{YN_R};$$

$$\widetilde{Cb} = \frac{B - Y}{YN_B},$$

where R, G and B are red, green and blue colour components respectively, Y is the luminance, $\widetilde{Cr}$ and $\widetilde{Cb}$ are luminance-normalised chrominances and $K_R$, $K_g$, $K_B$, $N_R$ and $N_B$ are constants.

The luminance-normalised colour space may have components:

$$Y' = K_R R' + K_g G' + K_B B';$$

$$\widetilde{Cr} = \frac{R' - Y'}{Y'N_R};$$

$$\widetilde{Cb} = \frac{B' - Y'}{Y'N_B},$$

where R', G' and B' are gamma-corrected red, green and blue colour components respectively, Y' is the gamma-corrected luminance, $\widetilde{Cr}$ and $\widetilde{Cb}$ are luminance-normalised chrominances and $K_R$, $K_g$, $K_B$, $N_R$ and $N_B$ are constants.

The colour data may be expressed in an RGB colour space and be in fixed point format, and the step of transforming the colour data to the luminance-normalised colour space may comprise performing the following transformations to the colour data:

$$Y \leftarrow (k_R R + k_G G + k_B B + 2^{o-1})2^{-o}$$
$$\widetilde{C_r} \leftarrow (l_R(R - Y))Y^{-1}$$
$$\widetilde{C_b} \leftarrow (l_B(B - Y))Y^{-1}$$

where
$$k_R = \text{int}(2^o K_R),$$
$$k_G = \text{int}(2^o K_G),$$
$$k_B = 2^o - k_R - k_G,$$
$$l_R = \text{int}\left(\frac{2^p}{N_r}\right),$$
$$l_B = \text{int}\left(\frac{2^p}{N_b}\right)$$

and o and p are specified integer values.

The colour data may be expressed in an RGB colour space and be in fixed point format, and the step of transforming the colour data to the luminance-normalised colour space may comprise performing the following transformations to the colour data:

$$Y' \leftarrow (k_R R' + k_G G' + k_B B' + 2^{o-1})2^{-o}$$
$$\widetilde{C_r} \leftarrow (l_R(R' - Y'))Y^{-1}$$
$$\widetilde{C_b} \leftarrow (l_B(B' - Y'))Y^{-1}$$

where:
$$k_R = \text{int}(2^o K_R),$$
$$k_G = \text{int}(2^o K_G),$$
$$k_B = 2^o - k_R - k_G,$$
$$l_R = \text{int}\left(\frac{2^p}{N_r}\right),$$
$$l_B = \text{int}\left(\frac{2^p}{N_b}\right);$$

o and p are specified integer values and R' G' and B' are gamma-corrected red, green and blue colour components respectively.

The colour data may comprise a set of n-bit RGB colour values, and the transformed colour data may comprise a set of colour values each having m-bit $\widetilde{C_r}$ and $\widetilde{C_b}$ values, where m≥n.

In some examples, m≥n+6.

In some examples, $k_R = k_G = k_B = 1$, $N_r = N_b = 1$, o=1

The colour data may comprise a set of n-bit RGB colour values, and the transformed colour data may comprise a set of colour values each having m-bit $\widetilde{C_r}$ and $\widetilde{C_b}$ values, where m=n+1.

The one or more processing operations may comprise applying a gamma correction to the luminance channel of the transformed colour data.

The one or more processing operations may comprise filtering luminance-normalised chrominance channels of the transformed colour data.

The one or more processing operations may comprise determining a median value of a plurality of luminance-normalised chrominance values of pixels within a kernel.

The transforming the colour data to a luminance-normalised colour space may comprise performing a division operation to divide one or more chrominance values for a pixel by a luminance value for the pixel.

The division operation may be implemented using a CORDIC algorithm, wherein the number of iterations of the CORDIC algorithm that are performed is determined based on the range of possible luminance-normalised chrominance values in the luminance-normalised colour space.

According to a second aspect of the present disclosure, there is provided an apparatus for processing image data for an image, wherein the image data comprises colour data expressed in a first colour space, the apparatus comprising: a transformation unit configured to transform the colour data to a luminance-normalised colour space; and one or more processing units configured to perform one or more processing operations on the transformed colour data to generate processed image data.

The apparatus may further comprise a second transformation unit configured to transform the processed image data to the first colour space.

The luminance-normalised colour space may be a luminance-normalised luminance-chrominance colour space.

The luminance-normalised luminance-chrominance colour space may comprise: a luminance component, a first luminance-normalised chrominance component and a second luminance-normalised chrominance component.

The chrominance components may be dependent on the luminance.

The luminance-normalised luminance-chrominance colour space may be a luminance-normalised version of a YCbCr colour space.

The luminance-normalised colour space may have components:

$$Y = K_R R + K_g G + K_B B;$$
$$\widetilde{Cr} = \frac{R - Y}{YN_R};$$
$$\widetilde{Cb} = \frac{B - Y}{YN_B},$$

where R, G and B are red, green and blue colour components respectively, Y is the luminance component, $\widetilde{Cr}$ and $\widetilde{Cb}$ are luminance-normalised chrominance components and $K_R$, $K_g$, $K_B$, $N_R$ and $N_B$ are constants.

The luminance-normalised colour space may have components:

$$Y' = K_R R' + K_g G' + K_B B';$$
$$\widetilde{Cr} = \frac{R' - Y'}{Y' N_R};$$
$$\widetilde{Cb} = \frac{B' - Y'}{Y' N_B},$$

where R', G' and B' are gamma-corrected red, green and blue colour components respectively, Y' is the gamma-corrected luminance, $\widetilde{Cr}$ and $\widetilde{Cb}$ are luminance-normalised chrominances and $K_R$, $K_g$, $K_B$, $N_R$ and $N_B$ are constants.

The colour data may be expressed in an RGB colour space and be in fixed point format, and the transformation unit may be configured to apply the following transformations to the colour data to transform the colour data to the luminance-normalised colour space:

$$Y \leftarrow (k_R R + k_G G + k_B B + 2^{o-1})2^{-o}$$
$$\widetilde{C_r} \leftarrow (l_R(R - Y))Y^{-1}$$
$$\widetilde{C_b} \leftarrow (l_B(B - Y))Y^{-1}$$

where $$k_R = \text{int}(2^o K_R),$$
$$k_G = \text{int}(2^o K_G),$$
$$k_B = 2^o - k_R - k_G,$$
$$l_R = \text{int}\left(\frac{2^p}{N_r}\right),$$
$$l_B = \text{int}\left(\frac{2^p}{N_b}\right)$$

and o and p are specified integer values.

The colour data may be expressed in an RGB colour space and be in fixed point format, and the transformation unit may be configured to apply the following transformations to the colour data to transform the colour data to the luminance-normalised colour space:

$$Y' \leftarrow (k_R R' + k_G G' + k_B B' + 2^{o-1})2^{-o}$$
$$\widetilde{C_r} \leftarrow (l_R(R' - Y'))Y^{-1}$$
$$\widetilde{C_b} \leftarrow (l_B(B' - Y'))Y^{-1}$$

where $$k_R = \text{int}(2^o K_R),$$
$$k_G = \text{int}(2^o K_G),$$
$$k_B = 2^o - k_R - k_G,$$
$$l_R = \text{int}\left(\frac{2^p}{N_r}\right),$$
$$l_B = \text{int}\left(\frac{2^p}{N_b}\right);$$

o and p are specified integer values; and R' G' and B' are gamma-corrected red, green and blue colour components respectively.

The colour data may comprise a set of n-bit RGB colour values, and the transformed colour data may comprise a set of colour values each having $\widetilde{C_r}$ and $\widetilde{C_b}$ values, the transformation unit being configured to output m-bit $\widetilde{C_r}$ and $\widetilde{C_b}$ values, where m≥n.

In some examples, m≥n+6.

In some examples, $k_R = k_G = k_R = 1$, $N_r = N_b = 1$, o=1

The colour data may comprise a set of n-bit RGB colour values, and the transformed colour data may comprise a set of colour values each having $\widetilde{C_r}$ and $\widetilde{C_b}$ values, the transformation unit being configured to output m-bit $\widetilde{C_r}$ and $\widetilde{C_b}$ values, where m=n+1.

The one or more processing units may comprise a correction unit configured to apply a gamma correction to the luminance channel of the transformed image data.

The one or more processing units may comprise a filtering unit configured to filter luminance-normalised chrominance channels of the transformed colour data.

At least one of the one or more processing units may be configured to perform a processing operation comprising determining a median value of a plurality of luminance-normalised chrominance values of pixels within a kernel.

The transformation unit may be configured to perform a division operation to divide one or more chrominance values for a pixel by a luminance value for the pixel as part of transforming the colour data to a luminance-normalised colour space.

The transformation unit may be configured to implement the division operation using a CORDIC algorithm, the transformation unit being configured to determine the number of iterations of the CORDIC algorithm based on the range of possible luminance-normalised chrominance values in the luminance-normalised colour space.

According to a third aspect of the present disclosure there is provided a system for processing image data for an image, wherein the image data comprises colour data expressed in a first colour space, the system comprising:

a first device comprising:
a transformation unit configured to transform the colour data to a luminance-normalised colour space;
one or more processing units configured to perform one or more processing operations on the transformed colour data to generate processed image data; and a communication unit for transmitting the processed image data over a communication network; and a second device comprising:
one or more processing units configured to perform one or more processing operations on received processed image data to generate further processed image data; and
a transformation unit configured to transform the further processed image data to a colour space different from the luminance-normalised colour space.

One or both of the first and second devices may be configured in accordance with the apparatus summarised above.

The apparatus in accordance with the examples herein may be embodied in hardware on an integrated circuit.

There may be provided a method of manufacturing, using an integrated circuit manufacturing system, an apparatus in accordance with the examples herein.

There may be provided an integrated circuit definition dataset that, when processed in an integrated circuit manufacturing system, configures the system to manufacture an apparatus in accordance with the examples herein.

There may be provided a non-transitory computer readable storage medium having stored thereon a computer readable description of an integrated circuit that, when processed in an integrated circuit manufacturing system, causes the integrated circuit manufacturing system to manufacture an apparatus in accordance with the examples herein.

There may be provided an integrated circuit manufacturing system configured to manufacture an apparatus in accordance with the examples herein.

There may be provided an integrated circuit manufacturing system comprising:
  a non-transitory computer readable storage medium having stored thereon a computer readable integrated circuit description that describes an apparatus in accordance with the examples herein;

a layout processing system configured to process the integrated circuit description so as to generate a circuit layout description of an integrated circuit embodying the apparatus; and an integrated circuit generation system configured to manufacture the apparatus according to the circuit layout description.

There may be provided an apparatus configured to perform any of the methods herein.

There may be provided computer program code for performing a method as described herein.

There may be provided a non-transitory computer readable storage medium having stored thereon computer readable instructions that, when executed at a computer system, cause the computer system to perform the method as described herein

BRIEF DESCRIPTION OF FIGURES

The present invention will now be described by way of example with reference to the accompanying drawings. In the drawings.

DETAILED DESCRIPTION

Figure 1:
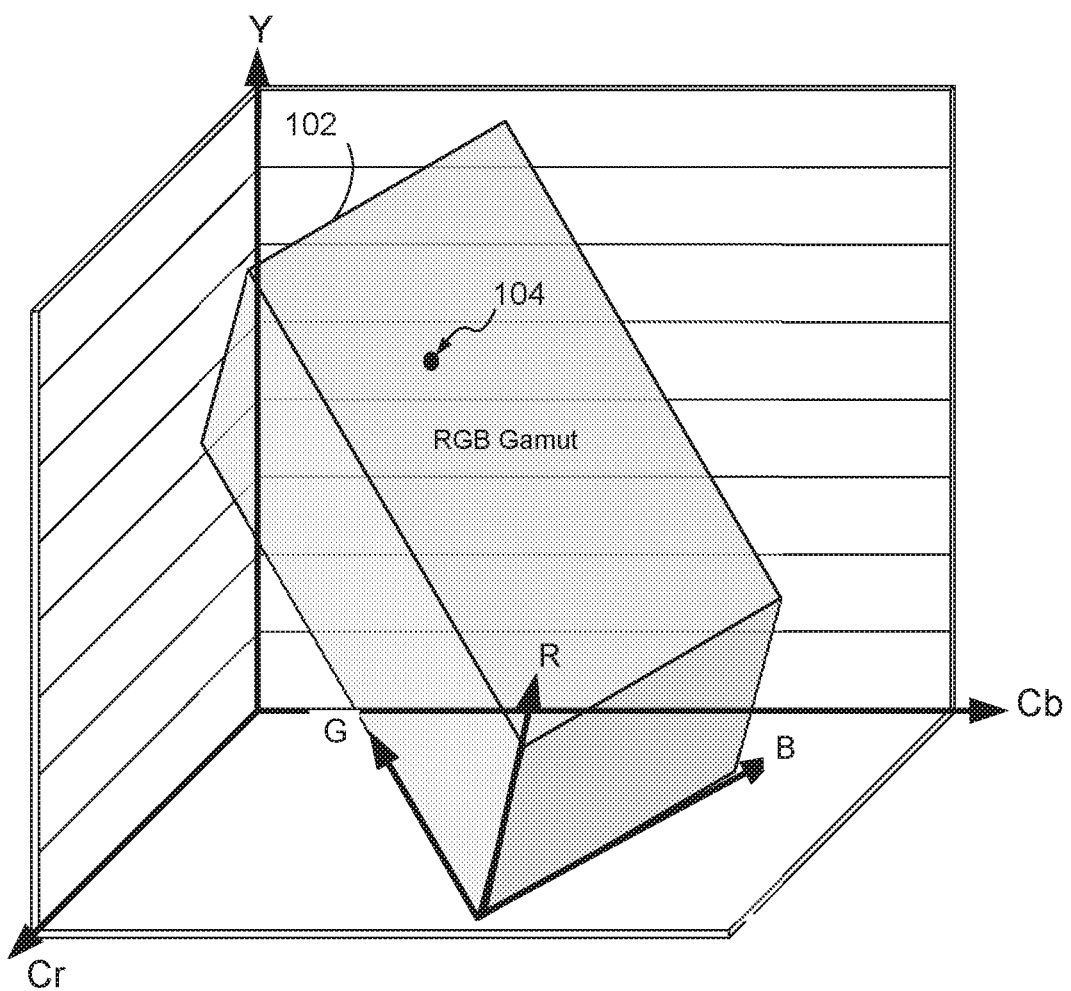
FIG. 1 shows a schematic illustration of the relationship between an RGB colour space and a YCbCr colour space.

The present disclosure is directed to techniques for processing digital images. The images have colour data expressed in a first colour space, for example an RGB colour space. To process an image, the colour data for the image is first transformed to express the colour data in a luminance-normalised colour space. One or more image processing operations are then performed on the transformed colour data (i.e. the colour data expressed in the luminance-normalised colour space). These processing operations may include, for example, gamma correction, filtering (e.g. filtering for colour anti-aliasing) and/or determining a median value of a plurality of luminance-normalised chrominance values of pixels within a kernel. For example, a chromatic aliasing filter (CAF) may be implemented as part of a camera pipeline, and may be used to reduce aliasing artefacts in the chroma components of pixel values. After the processing operations have been performed, the colour data is optionally transformed to a further colour space. That further colour space could be the first colour space; i.e. the post-processed colour data may be transformed back to the first colour space.

The colour space which is luminance-normalised may be a luminance-chrominance colour space having a luminance component and first and second chrominance components. The chrominance components may themselves depend on the luminance. By normalising the chrominance components of this luminance-chrominance colour space with the luminance, the inventor has found that the resulting luminance-normalised luminance-chrominance colour space provides improved separation between the chrominance and luminance than conventional luminance-chrominance colour spaces such as YCbCr, as well as RGB colour spaces. This in turn allows image processing operations (such as gamma correction or filtering) to be performed whilst reducing the amount of incurred colour distortion in the image.

A CAF may be configured to extract statistics from a kernel of pixels in order to find a significant representative value (e.g. a median value) of the luminance-normalised chroma components of the pixels within the kernel. The method is proven to provide a benefit if the statistics are robust to non-Gaussian, non-normal, multi-modal pixel value distributions. For example, the statistics may be provided by a median filter, but in other examples the statistics may be provided by other means. The normalisation of the chroma components achieves strong luminance invariance in the median calculations. The median calculations may be performed using reduced precision in the luminance-normalised colour space in order to select the median component from a kernel, and then a higher precision normalisation of the chroma values may be performed on the selected median chroma values.

The transformation of the colour data to a luminance-normalised colour space may comprise performing a division operation to divide one or more chrominance values (e.g. Cb and/or Cr) for a pixel by a luminance value (e.g. Y) for the pixel. The division operation may be implemented using a CORDIC (Coordinate Rotation Digital Computer) algorithm, wherein the number of iterations of the CORDIC algorithm that are performed is determined based on the range of possible luminance-normalised chrominance values in the luminance-normalised colour space. CORDIC is a known algorithm that can be used to implement computations such as divisions. For example, a CORDIC algorithm can perform a division operation iteratively using only shift and addition/subtraction operations. The number of bits of precision in the result increases as the number of iterations of the CORDIC algorithm which are performed increases. The range of possible luminance-normalised chrominance values (i.e. Cb/Y and Cr/Y) is constrained relative to (i.e. smaller than) the range of possible unnormalised chrominance values (i.e. Cb and Cr). Therefore the number of bits needed to represent the full range of chroma values is reduced by the normalisation. The efficiency of the CORDIC algorithm is optimised by setting the number of iterations that are performed in accordance with the number of bits of accuracy needed in the normalised values. The efficiency gains to the CORDIC algorithm that can be achieved depend on the particular colour space that is used. For example, in BT.2020 colour space the luminance-normalised Cb range is −0.5 to 7.2 and the luminance-normalised Cr range is −0.6 to 1.8. The number of iterations of the CORDIC that are performed to normalise the Cb and Cr values can be set accordingly. In particular, the number of iterations may be different for normalising the Cb and Cr values. The range of values for the normalised Cb values is greater than the range of values for the normalised Cr values, such that the normalisation of Cb may include more iterations than the normalisation of Cr.

Examples of how the colour data is converted to the luminance-normalised colour space are described below. Examples of processed images in the luminance-normalised colour space generated by the inventor and demonstrating reduced distortion compared to existing colour spaces are also included in the accompanying figures.

Figure 2:
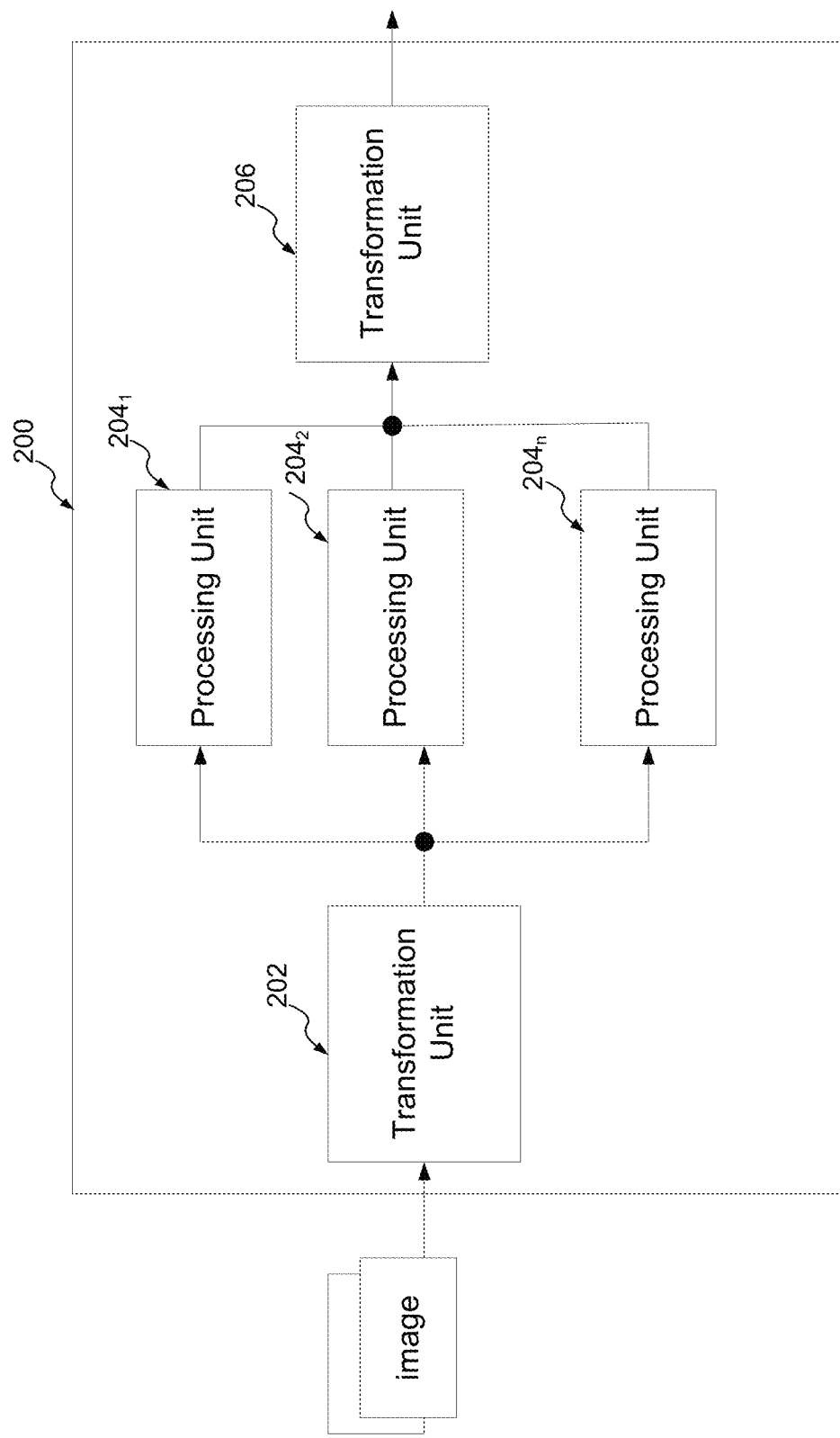
FIG. 2 shows an example of an image processor for performing image processing operations on image colour data expressed in a luminance-normalised colour space.

FIG. 2 shows an example of an image processor 200. The image processor comprises a first transformation unit 202, a set of processing units $204_{1,2\ldots n}$ and a second transformation unit 206. An output of the first transformation unit 202 is coupled to an input of each of the processing units $204_{1,2\ldots n}$. Outputs of each of the processing units are coupled to an input of the second transformation unit 206. The image processor may comprise any suitable number of processing units $204_{1,2\ldots n}$. In some examples, the image processor comprises a single processing unit $204_n$; in other examples the image processor comprises multiple processing units (i.e. n≥1). FIG. 2 shows the processing units $204_1$ to $204_n$ being arranged in parallel, whereas in some other examples some or all of the processing units may be arranged in series in the image processor.

Figure 3:
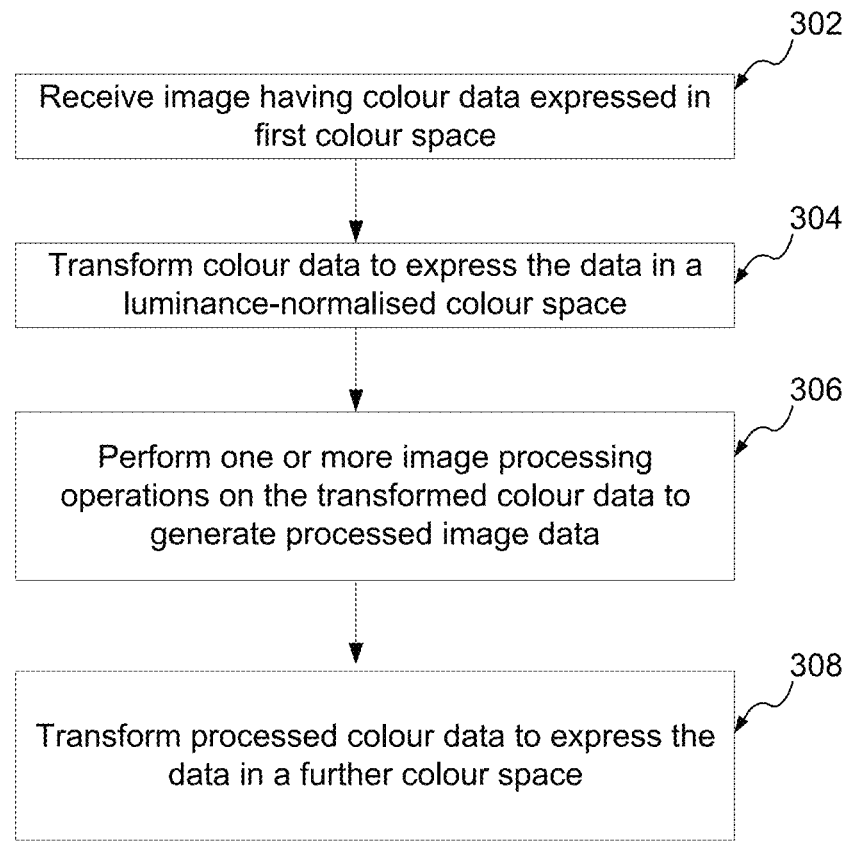
FIG. 3 shows a flowchart of steps for transforming the colour data of an image to a luminance-normalised colour space and performing processing operations on the transformed data.

The operation of the image processor 200 will now be described with reference to the flowchart in FIG. 3.

At step 302, the image processor 200 receives data for an image. The image could for example be a graphics image (e.g. rendered by a graphics pipeline), or an image captured by a camera. The image may be formed of a plurality of pixels arranged in an n×m array. The image data may be received by an input interface of the processor 200 (not shown in FIG. 2).

The image data comprises colour data for the image. The colour data may comprise a set of colour values indicating the colour at each of a plurality of regions of the image. The colour data could for example indicate the colour for each pixel of the image. More generally, the colour data may indicate the colour for each pixel block of the image, where each pixel block contains one or more pixels. The image data may be in a compressed or decompressed format. For example, the image data may be compressed by storing the colour data on a per-block resolution (where each block contains multiple pixels) rather than a per-pixel resolution. As another example, the image data may be compressed by storing the colour data at a lower precision (e.g. using a reduced number of bits). As will be apparent from the following, the techniques described herein are applicable to a variety of image data and colour data types and formats.

The colour data is expressed in a first colour space. That is, the colour values of the colour data describe the colours of the image using the colour components of the first colour space. In this example, the first colour space is an RGB colour space having red (R), green (G) and blue (B) components. Thus, each colour value of the colour data comprises a red, green and blue component value.

At step 304, the first transformation unit 202 transforms the colour data for the image to a luminance-normalised colour space. That is, the transformation unit 202 applies a transformation to the colour data to express the colour data in a luminance-normalised colour space. The colour data expressed in the luminance-normalised colour space may be referred to herein as transformed colour data. Thus, the transformed colour data may comprise a set of colour values indicating the colour at a respective region (e.g. pixel block) of the image, but where each colour value is expressed in the luminance-normalised colour space.

The luminance-normalised colour space may be a luminance-normalised luminance-chrominance colour space. That is, the colour space to which the colour data is transformed may be a luminance-chrominance colour space that has been luminance-normalised. The luminance-chrominance colour space may comprise a luminance component; a first chrominance component and a second chrominance component. The chrominance components themselves may be dependent on the luminance.

The luminance-chrominance colour space may be luminance normalised so that the luminance-normalised colour space comprises a luminance component and first and second luminance-normalised chrominance components. That is, only the chrominance components may be luminance normalised. Thus, following transformation by the transformation unit 202, each colour value comprises a luminance component, and first and second luminance-normalised chrominance components. Each colour value of the transformed colour data therefore describes a colour of the image using a luminance value, a first luminance-normalised chrominance value and a second luminance-normalised chrominance value.

The luminance-chrominance colour space could for example be the YCbCr colour space, where Y is the luminance, Cb is a first chrominance component (which may be referred to as the blue-chrominance component) and Cr is a second chrominance component (which may be referred to as the red-luminance component). The YCbCr colour space has components Y, Cb and Cr which can be determined from the R, G and B components of the colour values in RGB colour space according to:

$$Y = K_R R + K_G G + K_B B$$

$$Cr = \frac{R - Y}{N_r}$$

$$Cb = \frac{B - Y}{N_b}$$

The luminance-normalised colour space may be denoted as YCbCr/Y, which comprises colour components: Y; Cb/Y and Cr/Y. The luminance-normalised colour space may therefore have components Y, $\widetilde{Cr}$ and $\widetilde{Cb}$, where:

$$Y = K_R R + K_G G + K_B B \tag{1}$$

$$\widetilde{Cr} = \frac{R - Y}{Y N_r} \tag{2}$$

$$\widetilde{Cb} = \frac{B - Y}{Y N_b} \tag{3}$$

where Y denotes the luminance, $\widetilde{Cr}$ denotes the first luminance-normalised component (i.e. $\widetilde{Cr}$ =Cr/Y), $\widetilde{Cb}$ denotes the second luminance-normalised component ($\widetilde{Cb}$ =Cb/Y), and $K_R$, $K_G$, $K_B$, $N_r$ and $N_b$ are constants. The constants could be defined by a suitable ITU standard, such as ITU-R BT.2020; ITU-R BT.601; ITU-R BT.709, etc.

Thus, if the input colour data comprises a set of RGB colour values (i.e. each colour value comprises an R, G and B component value), the transformation unit 202 may apply transformations to that colour data so that following the transformation, each colour value comprises a Y component value, $\widetilde{Cr}$ component value and $\widetilde{Cb}$ component value (i.e. each colour value is a Y$\widetilde{Cr}\widetilde{Cb}$ colour value).

Although the luminance component of the luminance-normalised colour space has been denoted 'Y', denoting colour values that have not been subject to gamma correction, it will be understood that the above transformations apply analogously to colour data that has been gamma corrected. For gamma-corrected colour data, the luminance-normalised colour space may comprise the colour components:

$$Y' = K_R R' + K_G G' + K_B B' \quad (4)$$

$$\widetilde{Cr} = \frac{R' - Y'}{Y' N_r} \quad (5)$$

$$\widetilde{Cb} = \frac{B' - Y'}{Y' N_b} \quad (6)$$

Here, R', G' and B' denote gamma-corrected R, G and B components.

It will be appreciated that compared to the conventional luminance-chrominance colour space YCbCr, the luminance-normalised luminance-chrominance colour space contains chrominance components that are normalised by the luminance value Y or Y'. This provides improved separation between colour and luminance compared to the YCbCr colour space and other colour spaces such as RGB, enabling manipulations of the luminance value with improved preservation of colour. This will be explained in more detail below.

The transformed colour data (i.e. the colour data expressed in the luminance-normalised colour space) is output from the transformation unit to the one or more processing units $204_{1,2 \ldots n}$.

At step 306, the one or processing units $204_{1,2 \ldots n}$ perform one or more processing operations on the transformed colour data to generate processed image data.

Figure 4:
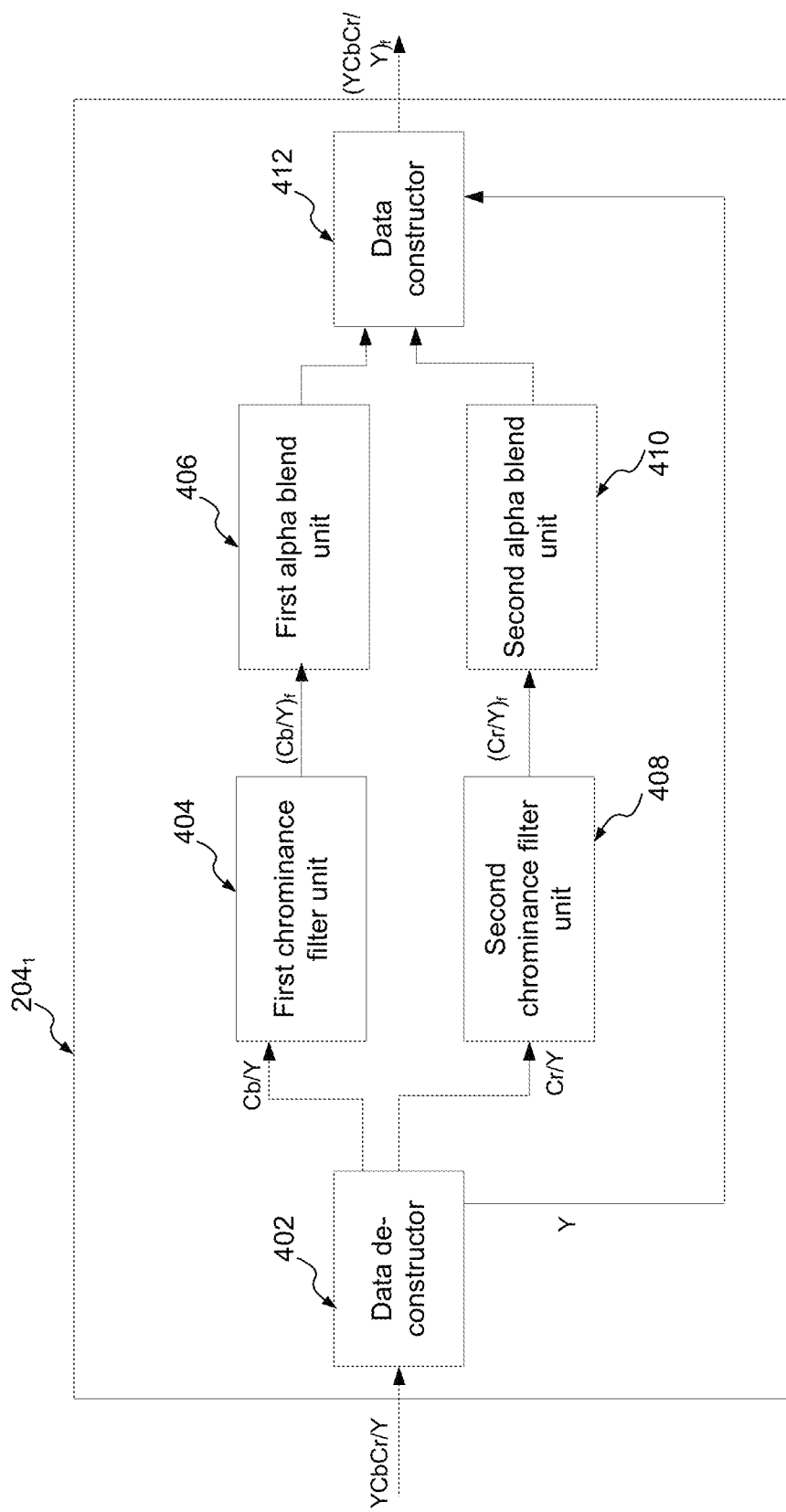
FIG. 4 shows an example of a processing unit of the image processor shown in FIG. 2 for performing a filtering operation in the luminance-normalised colour space.

The processing operations could be image processing operations. The processing operation could for example be an image filtering operation, such as a median filtering operation. For instance, the filtering operation could be a chrominance filtering operation, in which the luminance-normalised chrominance channels of the image are filtered. An example of a processing unit $204_n$ for performing a chrominance filtering operation is shown in FIG. 4. For the purpose of illustration, the processing unit chosen is unit $204_1$.

The processing unit $204_1$ is configured to perform chrominance-filtering operations on the transformed image colour data. Thus, in this example the processing unit $204_n$ is an example of a filtering unit.

The processing unit $204_1$ comprises a data de-constructor 402 configured to receive the transformed image colour data, which in this example is colour data expressed in the luminance-normalised YCbCr space, denoted YCbCr/Y. The data de-constructor 402 is configured to separate the transformed colour data into its constituent components, which in this example are the luminance component Y, first luminance-normalised chrominance component Cb/Y, and second luminance-normalised chrominance component Cr/Y. The luminance-component of the transformed colour data may correspond to the luminance channel of the image input into the image processor 200. Likewise, the first luminance-normalised chrominance component Cb/Y of the transformed colour data may correspond to the luminance-normalised blue chrominance channel of the image; and the second luminance-normalised chrominance component Cr/Y of the transformed colour data may correspond to the luminance-normalised red chrominance channel of the image.

The luminance-normalised chrominance component Cb/Y of the colour data is input into a first chrominance filter unit 404. The filter unit 404 operates to filter the Cb/Y component of the data, for example using a median filter. In some examples, the filter unit 404 may comprise more than one median filter, where each median filter uses a different window size to perform its filtering operation. In this case, the outputs of the two median filters may be blended (e.g. on a per-pixel basis). The use of more than one median filter to filter a chrominance channel may be advantageous for effectively filtering the channel. For example, filters having larger windows may be more effective at preventing loss of vertical and/or horizontal resolution of the image compared to filters having smaller window sizes, but with the drawback that they have a greater destructive impact on image detail. By blending the outputs of two (or more) median filters having different window sizes, the contribution of each filter to the blended output can be controlled in dependence on the features of the corresponding part of the image.

The luminance-normalised chrominance component Cr/Y of the colour data is input to a second chrominance filter unit 408. Filter unit 408 operates to filter the Cr/Y component of the data, for example using a median filter. Similarly to the filter unit 404, the filter unit 408 may comprise one or more median filters having different widow sizes. In the case that the unit 408 comprises more than one median filter, the outputs of each median filter may be blended on a per-pixel or per block basis.

In this example, the processing unit $204_1$ does not filter the luminance component of the data Y.

The filtered blue-chrominance data (denoted $(Cb/Y)_f$) is optionally output from the filter unit 404 into a first alpha blend unit 406, which operates to apply an alpha (i.e. transparency) value to each value of the filtered chrominance component $(Cb/Y)_f$. The output of the first alpha blend unit 406 is then input into data constructor 412.

In other examples, the processing unit $204_1$ may not include the first alpha blend unit 406, and the output from the first chrominance filter unit 404 may be input directly into data constructor 412.

Similarly, the filtered red-chrominance data (denoted (Cr/Y)$_f$) of the colour data is optionally output from the filter unit 408 into a second alpha blend unit 410, which operates to apply an alpha value to each value of the filtered chrominance component $(Cr/Y)_f$. The output of the second alpha blend unit 410 is then input into the data constructor 412.

Again, in other examples the processing unit $204_1$ may not include the second alpha blend unit 410, and the output from the second chrominance filter unit 408 may be input directly into data constructor 412.

The data constructor 412 receives the luminance component Y of the transformed colour data, and the two filtered chrominance components $(Cb/Y)_f$ and $(Cr/y)_f$ and combines these data components to output processed image colour data. The processed image colour data (in this example) therefore contains a luminance component, a filtered luminance-normalised red-chrominance component $(Cr/Y)_f$, and a filtered luminance-normalised blue-chrominance component $(Cb/Y)_f$, and is denoted $(YCbCr/Y)_f$.

Other types of image processing operations that may be performed by the one or more processing units $204_{1,2...n}$ include luminance-manipulation operations in which the values of the luminance component of the transformed colour data are manipulated. An example of a luminance-manipulation operation is gamma correction. Gamma correction may involve applying a power law function to the luminance components of the transformed image colour data. The luminance-normalised chrominance components may be unaffected by the gamma correction (i.e. those components are not modified by the power law).

Figure 5:
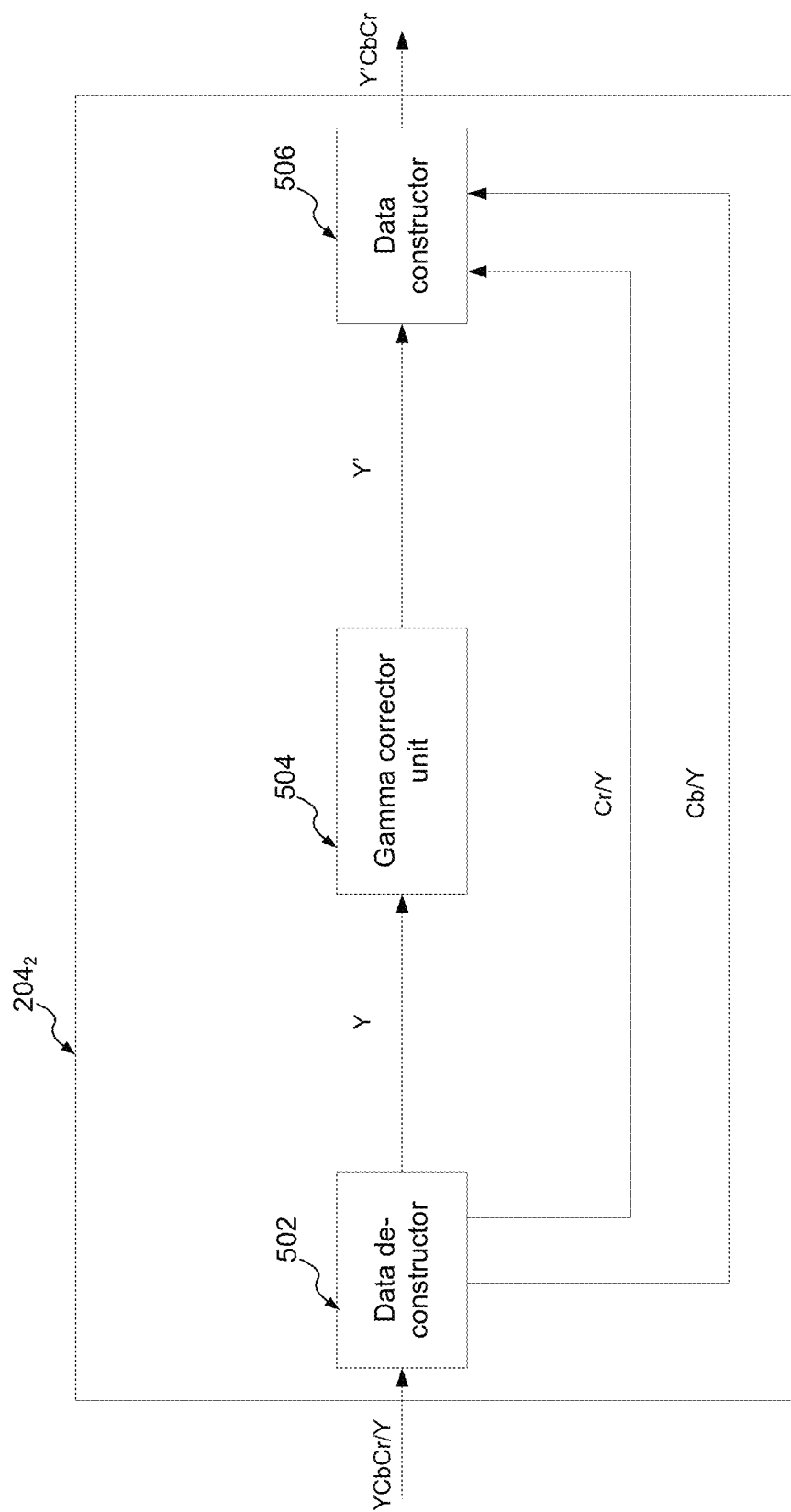
FIG. 5 shows an example of a processing unit of the image processor shown in FIG. 2 for performing a gamma correction in the luminance-normalised colour space.

An example of a processing unit $204_n$ for applying gamma correction is shown in FIG. 5. This processing unit is denoted $204_2$.

The processing unit $204_2$ comprises data de-constructor 502 configured to receive the transformed image colour data, which in this example is again colour data expressed in the luminance-normalised YCbCr space, denoted YCbCr/Y. The data de-constructor 502 separates the transformed colour data into its constituent components, which in this example are again the luminance component Y, first luminance-normalised chrominance component Cb/Y, and second luminance-normalised chrominance component Cr/Y.

The luminance component of the transformed colour data is input into a gamma corrector unit 504. The gamma corrector unit 504 is configured to apply a power law function to each luminance value (i.e. to the luminance component of each colour value). In particular, the corrector unit 504 may apply a power law function to generate a gamma-corrected luminance component, Y', where $Y'=Y^\gamma$ and γ is a numerical parameter. A typical value for γ=1/2.2. Of course, other values for γ are possible.

The gamma-corrected luminance component is output from the unit 504 and input into the data constructor 506.

The luminance-normalised chrominance components Cr/Y and Cb/Y are not processed in this example and are input directly into the data constructor from the data de-constructor.

The data constructor 506 receives the gamma-corrected luminance component Y' and the luminance-normalised chrominance components Cb/Y and Cr/Y and combines these components to output processed image colour data. In this example, the processed image colour data therefore contains a gamma-corrected luminance component (Y'), a luminance-normalised blue chrominance component (Cb/Y) and a luminance-normalised red chrominance component (Cr/Y), and is denoted Y'CbCr/Y.

Image processor 200 may comprise both processing units $204_1$ and $204_2$. For example, the luminance component Y of the transformed colour data may be gamma corrected whilst the luminance-normalised chrominance components are filtered.

That is, the processing units $204_1$ and $204_2$ may operate in parallel to process the luminance component and luminance-normalised chrominance components in parallel.

In another arrangement, the functionality of both processing units $204_1$ and $204_2$ may be integrated within a single processing unit. That is, the processing unit may comprise: a gamma corrector unit (e.g. unit 504); a first filtering unit (e.g. unit 404) and a second filtering unit (e.g. unit 408). This processing unit may optionally include first and second alpha blending units (e.g. units 406 and 410).

Performing the image processing operations in a luminance-normalised colour space may provide improved-quality images compared to performing the operations in conventional colour spaces such as RGB and YCbCr. This is because the luminance-normalised colour space (e.g. YCbCr/Y) may provide improved preservation of colour under manipulations of the luminance value (e.g. during gamma correction) and under image filtering near strong luminance boundaries within the image. By luminance-normalising the chrominance components of a luminance-chrominance colour space, the transformed colour data encodes the relative scale of the chrominance values, rather than encoding the colour relative to the luminance differentially as in conventional YCbCr colour space.

A series of images obtained by the inventor that demonstrate the improved performance of an image processor that performs image processing operations in a luminance-normalised colour space will now be described with reference to FIGS. 6 to 8.

Figure 6:
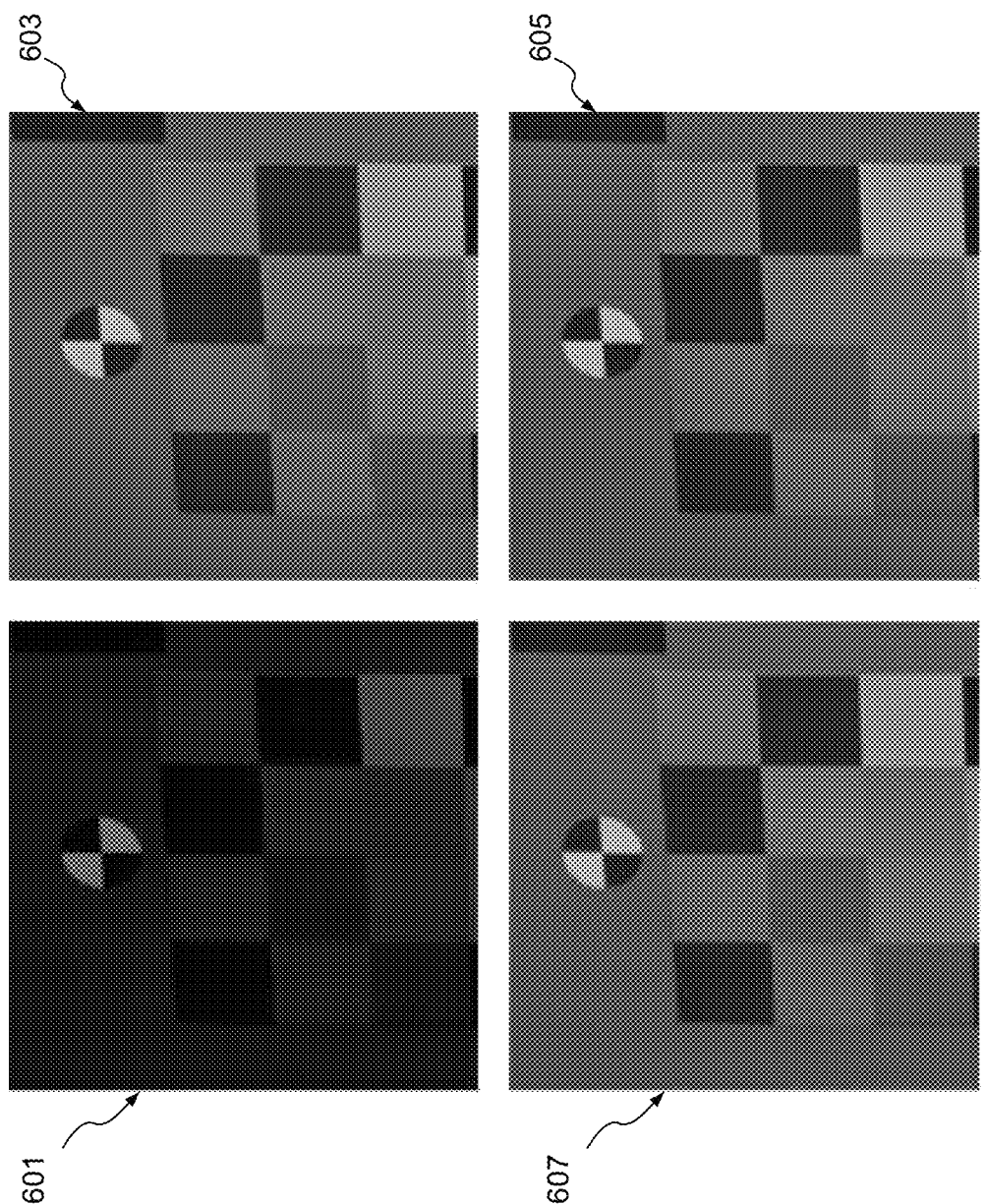
FIG. 6 shows a series of images obtained by the inventor illustrating the application of gamma correction in various colour spaces.

FIG. 6 shows a first example series of images obtained by the inventor. Image 601 shows a non-gamma corrected image obtained from a camera. The image 601 has a linear radiometric intensity scale. Images 603, 605 and 607 show the same image following gamma correction with a gamma value of γ=1/2.2 Image 603 shows the image following gamma correction applied to image 601 in RGB colour space (i.e. gamma correction is applied to the colour data of image 601 expressed in RGB colour space). Image 605 shows the image following gamma correction applied to the luminance channel of the image 601 in YCbCr colour space (i.e. gamma correction is applied to the luminance component of the colour data of image 601 expressed in YCbCr colour space). Finally, image 607 shows the image following gamma correction applied to the luminance channel of image 601 in a luminance-normalised colour space YCbCr/Y. It can be seen that image 607 demonstrates improved colour retention and less desaturation compared to images 603 and 605.

Figure 7:
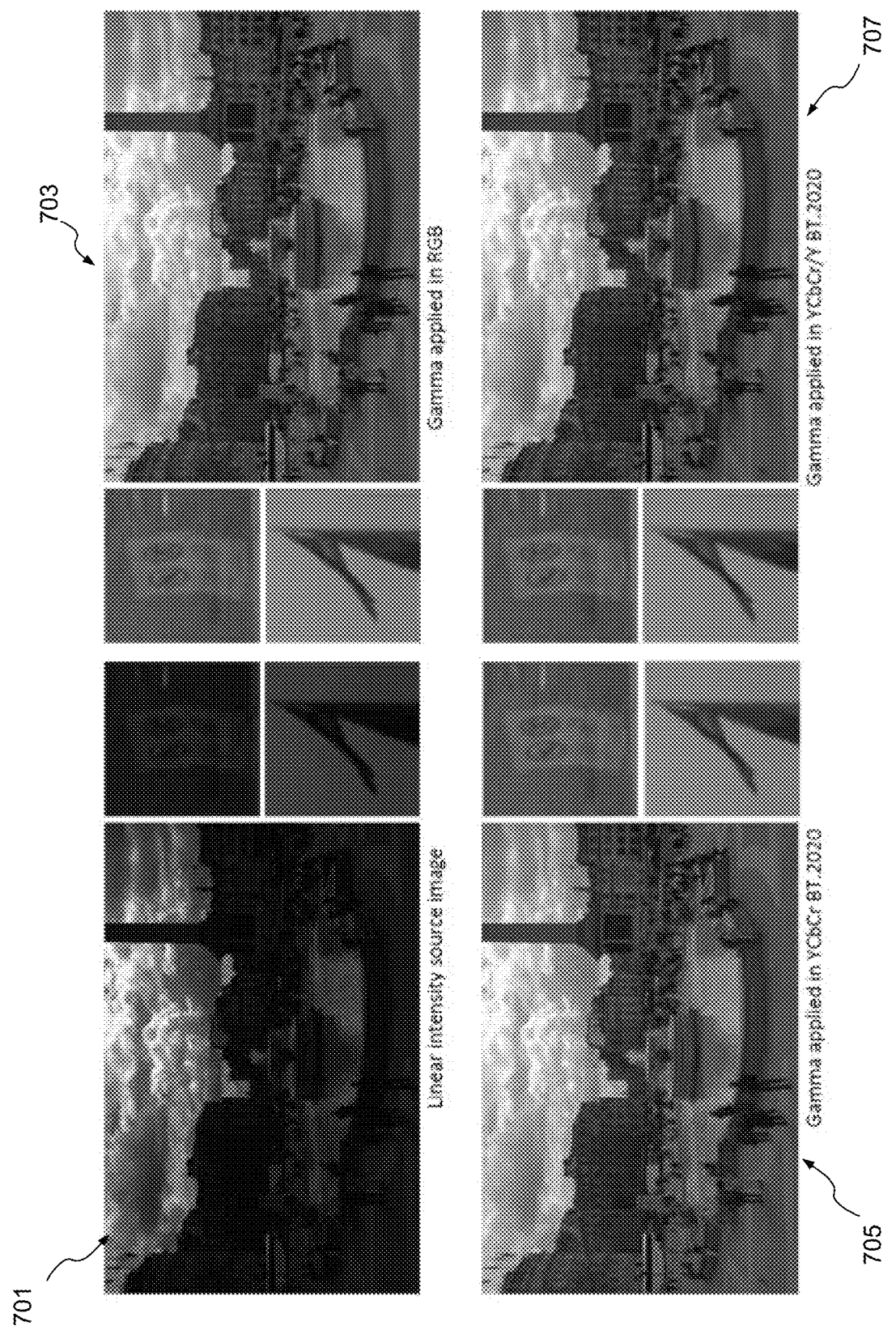
FIG. 7 shows a further series of images obtained by the inventor illustrating the application of gamma correction in various colour spaces.

FIG. 7 shows a further series of images demonstrating improved image quality following gamma correction in the luminance-normalised colour space. The source image is shown at 701. The source image is a linear intensity image. The same image following gamma correction is shown at 703, 705 and 707. Image 703 shows the image following gamma correction applied to each of the R, G and B channels. Image 705 shows the image following gamma correction applied to the luminance channel of the image 701 having colour data expressed in the conventional YCbCr colour space. Image 707 shows the image following gamma correction applied to the luminance channel of the image 701 having colour data expressed in the luminance-normalised colour space YCbCr/Y. It can be seen that images 703 and 705 suffer from a loss of colour saturation compared to image 707, further illustrating how the luminance-normalised colour space YCbCr/Y better preserves colour saturation across changes in luminance.

Figure 8:
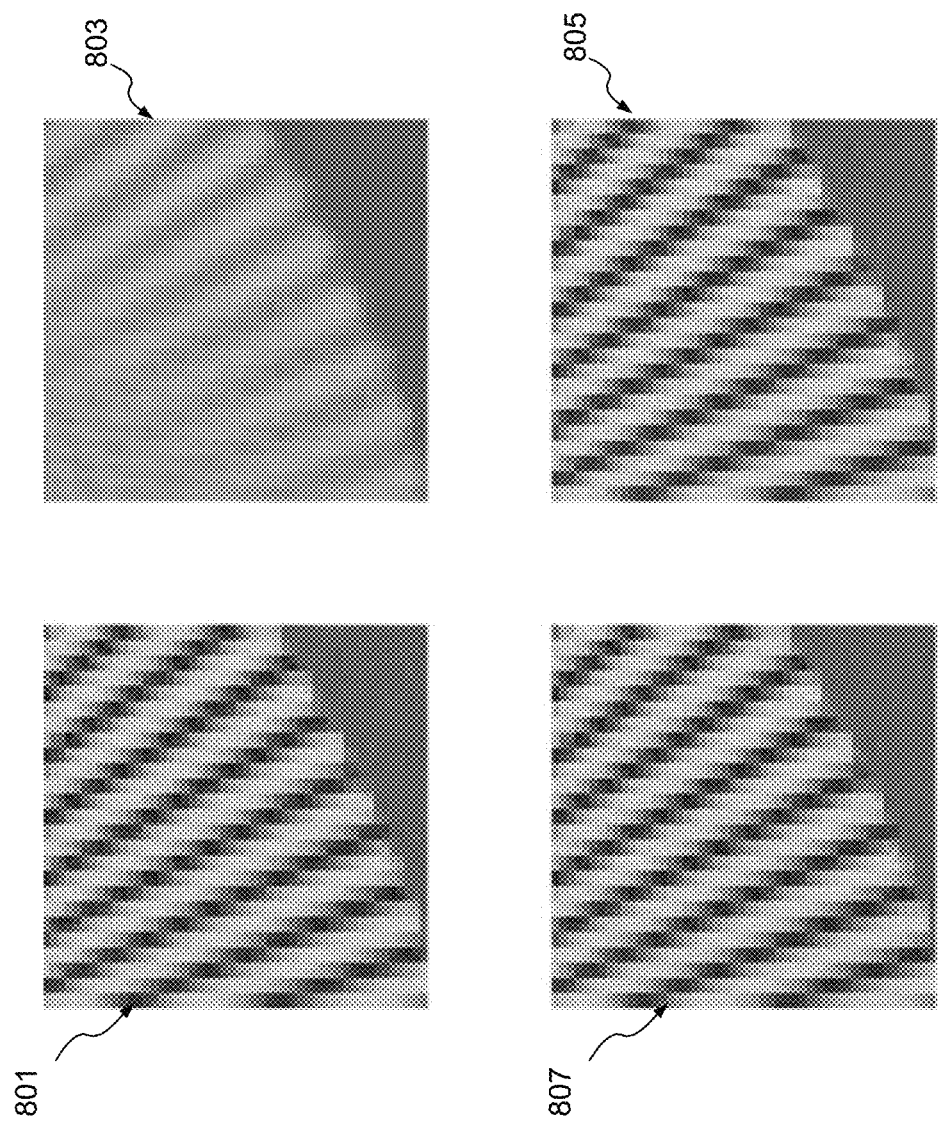
FIG. 8 shows a series of images obtained by the inventor illustrating the application of a median filter operation in various colour spaces.

FIG. 8 shows another series of images obtained by the inventor. The input (source) image is shown at 801. The same image following median filtering is shown at 803, 805 and 807. Image 803 shows the image following the application of a median filter to each of the R, G and B channels (i.e. the median filter is applied to the R, G and B components of the colour data for the source image). Because the RGB colour space does not provide a way to separate luminance and colour, filtering the image results in a relatively large loss of brightness information. Image 805 shows the image following application of the median filter to the chrominance channels Cr and Cb of the image having colour data expressed in conventional YCbCr colour space. It can be seen that, compared to image 803, image 805 preserves the brightness information in the image, but results in the colours of the darker regions of the image being oversaturated and the colours of the lighter regions of the image being under-saturated. Image 807 shows the image following the application of the median filter to the luminance-normalised chrominance channels of the image having colour data expressed in the luminance-normalised colour space YCbCr/Y. It can be seen that image 807 preserves the brightness information. Moreover, because the luminance-normalised colour space isolates the brightness information (the luminance) from the colour information (the chrominance), colour saturation of the image is not affected by changes in luminance.

The above examples serve to illustrate the potential improvements in image quality brought about by performing image processing operations in a luminance-normalised colour space.

Referring back to FIG. 2, the processed image colour data is output from the processing units $204_{1,2...n}$ into the second transformation unit 206.

At step 308, the second transformation unit 206 transforms the processed image data to a further image colour space. That is, the second transformation unit transforms the processed image colour data to express this data in a further colour space.

In one example, the transformation unit 206 operates to transform the processed image colour data back to the first colour space (i.e. back to the colour space the input image colour data was expressed in). That is, the transformation 206 may operate to apply an inverse transformation to the transformation applied by the transformation unit 202.

For example, the second transformation unit 206 may transform the processed image colour data to an RGB colour space. If the first transformation unit 202 transforms the colour data of the input image to the luminance-normalised colour space YCBCr/Y in accordance with equations (1)-(3), the second transformation unit 206 may transform the processed colour data back to the RGB colour space by applying the following transformations:

$$R \leftarrow \widetilde{Cr}\, YN_r + Y \quad (7)$$

$$B \leftarrow \widetilde{Cb}\, YN_b + Y \quad (8)$$

$$G \leftarrow (Y - K_R R - K_B B) K_G^{-1} \quad (9)$$

The transformation unit 206 may apply analogous transformations in the case that the colour data of the input image was gamma colour corrected (i.e. the reverse transformations to the transformations indicated by equations (4), (5) and (6).

The colour space to which the transformation unit 206 transforms the processed colour data may vary by implementation. For example, if the processed image data is to be used for image compression, the transformation unit 206 may transform the processed colour data to conventional YCbCr colour space, which may enable the data to be compressed via chrominance sub-sampling, for example. In another example, chroma sub-sampling may be applied to the image data in YCbCr/Y colour space. Such an approach conveniently takes advantage of luma normalisation when reconstructing a full-resolution image upon decompression.

As another example, if the processed image data is to be output for display (e.g. on a monitor) or used as part of a graphics processing pipeline, the processed colour data may be transformed to an RGB colour space.

In a practical implementation, the components of the image processor 200 (e.g. the transformation units 202, 206 and/or the processing units $204_{1,2...n}$) may be fixed point (i.e. integer) systems. That is, the components of the processor 200 may be configured to operate on fixed point data.

To determine the precision of the fixed-point data given initial n-bit RGB colour data (i.e. each colour value is an RGB colour value expressed using n bits), consideration will first be given to the value ranges in the luminance-normalised colour space YCbCr/Y. If each colour value is n bits, it follows from equation (1) that the value range of the luminance Y, is:

$$Y \in [0, 2^n - 1] \quad (10)$$

With reference to equation (2), it can be seen that the minimum value of $\widetilde{Cr}$ occurs when R=0. By re-arranging equation (1) in terms of R and substituting into equation (2), the expression for $\widetilde{Cr}$ becomes:

$$\widetilde{Cr} = \frac{(Y - K_G G - K_B B) K_R^{-1} - Y}{Y N_r} \quad (11)$$

It can be seen that the maximum value of $\widetilde{Cr}$ occurs when G=B=0, from which it follows that the value range for $\widetilde{Cr}$ is:

$$\widetilde{Cr} \in [-N_b^{-1}, (1 - K_R) K_R^{-1} N_r^{-1}] \quad (12)$$

Similarly, the range for $\widetilde{Cb}$ can be found to be:

$$\widetilde{Cb} \in [-N_b^{-1}, (1 - K_B) K_B^{-1} N_b^{-1}] \quad (13)$$

The transformations shown in equations (1) to (3) can be modified for fixed point data representation by defining the following parameters:

$$k_R = \mathrm{int}(2^o K_R) \quad (14)$$

$$k_G = \mathrm{int}(2^o K_G) \quad (15)$$

$$k_B = 2^o - k_R - k_G \quad (16)$$

$$l_R = \mathrm{int}\left(\frac{2^p}{N_r}\right) \quad (17)$$

$$l_B = \mathrm{int}\left(\frac{2^p}{N_b}\right) \quad (18)$$

Here, o and p are integer parameters, and int( ) is a function that rounds down to the nearest integer.

The transformation unit 202 may then apply the following transformations to the colour values of the input colour data:

$$Y \leftarrow (k_R R + k_G G + k_B B + 2^{o-1}) 2^{-o} \quad (19)$$

$$\widetilde{C}_r \leftarrow (l_R (R - Y)) Y^{-1} \quad (20)$$

$$\widetilde{C}_b \leftarrow (l_B (B - Y)) Y^{-1} \quad (21)$$

In equation (19), the term $2^{o-1}$ is a rounding term. The multiplication by $2^{-o}$ reverses the scaling introduced from the summation of $k_R$, $k_G$, $k_B$ as defined in equations (14), (15) and (16). Equations (20) and (21) are replaced with the equations $\widetilde{C}_r \leftarrow 0$; $\widetilde{C}_b \leftarrow 0$ respectively for the special case Y=0.

Thus, transformation unit 202 adapted to operate on fixed point data may transform the colour data of the input images into the luminance-normalised colour space using the transformations specified in equations (19) to (21).

Equations (19) to (21) give the following value ranges for fixed point format as:

$$Y \in [0, 2^n - 1] \tag{22}$$

$$\widetilde{Cr} \in [-2^p N_r^{-1}, 2^p(1-K_R)K_R^{-1}N_r^{-1}] \tag{23}$$

$$\widetilde{Cb} \in [-2^p N_b^{-1}, 2^p(1-K_B)K_B^{-1}N_b^{-1}] \tag{24}$$

The values of o and p can then be chosen so that the required computation precision of the chrominance data in the luminance-normalised colour space is maintained. For the sake of simplicity, the maximum RGB value is taken hereafter as $2^n$, rather than $2^{n-1}$. Suitable values of o and p can be determined from the output precision of the colour data, and the precision required to resolve minimal changes in luminance-normalised chrominance.

The output precision of the luminance data may be maintained at the same precision as the RGB data. The output precision m of the chrominance data (i.e. the number of bits required to accurately represent the chrominance data in fixed point format) can be determined from the maximum values of $\widetilde{Cr}$ and $\widetilde{Cb}$ as:

$$m = \log_2[2^p(1-K_c)K_c^{-1}N_c^{-1}] + 1 = p + \log_2[(1-K_c)K_c^{-1}N_c^{-1}] + 1 \tag{25}$$

where c is the channel having minimum K, and the value '+1' accommodates the sign bit.

As an example, using the value of the transformation constants specified in the ITU-R BT.2020 standard, m=p+5.

Thus, the units of the image processor 200 may be configured to output chrominance values with a precision of m=p+5 bits, where p is a specified integer dependent on implementation that can be chosen to prevent quantisation loss.

Considering now the chrominance resolution, it is noted that the change in luminance-normalised chrominance as a result of a minimum change to RGB values (e.g. ±1) is minimised when the luminance is at its maximum value (due to the luminance being in the denominator of the expression for luminance-normalised chrominance). Luminance is at its maximum when $R=G=B=2^n$ (at which point the chrominance is equal to zero). The smallest change in chrominance is made by decrementing B by 1, i.e. by setting $B=2^{n-1}$. The minimal incremental change in luminance-normalised chrominance can therefore be determined by evaluating the equation (21) with $Y \approx R=G=2^n$ and $B=2^n-1$. Mathematically, the magnitude of the minimum change in luminance-normalised chrominance can be expressed as:

$$\widetilde{C}_{\Delta min} = \widetilde{C}_b^- |_{Y=2^n, B=2^n-1} = \left| \frac{2^p}{N_b} \frac{(2^n - 1 - 2^n)}{2^n} \right| = (2^p N_b^{-1}) 2^{-n} \tag{26}$$

It follows from equation (26) that in order for the chrominance to be non-zero using integer arithmetic, $2^p N^{-1} \geq 2^n$, and thus:

$$p - \log_2 N \geq n \tag{27}$$

In general, the ITU standards define the transformation constants so that $1 \leq N_r, N_b \leq 2$, and thus $\log_2 N$ can be rounded up to '1'. From this, it follows that the requirement for resolving all chrominance values in the luminance-normalised colour space is that:

$$p \geq n+1 \tag{28}$$

It was determined above that, for transformation constants specified by ITU-R BT.2020, m=p+5. It follows that to maintain full chrominance resolution:

$$m \geq n+6 \tag{29}$$

Equation (29) conveys that it is not possible to maintain full chrominance resolution using the same number of bits used to specify each RGB colour value of the input image. Thus, the components of the processor 200 may be configured to output chrominance data with a precision of m bits, where m>n, and in some examples m≥n+6, where n is the number of bits used to specify each colour value of the input image. In so doing the full chrominance resolution may be maintained. However, depending on the application, some loss of chrominance precision may be acceptable to reduce system cost. It has been appreciated that the human visual system can be relatively insensitive to a loss in chrominance detail. It may therefore be beneficial in some applications to incur some loss in chrominance precision to reduce the system cost. Thus, in other examples, the components of the processor 200 may be configured to output chrominance data with a precision of m' bits. The value of m' could be equal to n. In some examples, n≤m'<n+6.

A working precision may also be set that specifies a minimum precision to compute equations (19) to (21). The working precision may therefore be the precision at which the transformation unit 202 operates according to. The transformation unit 202 may operate to perform multiplication operations before division operations when computing an equation (19), (20), (21). The precision of a multiplier is the sum of precisions of its operands. After the division operations, the precision can be reduced to the output precisions.

The luminance working precision of the transformation unit 202 (i.e. the working precision of the transformation unit 202 when computing equation (19)) may therefore be given by: n+o.

The chrominance working precision of the transformation unit 202 (i.e. the working precision of the transformation unit 202 when computing equations (20) and (21)) may be given by:

$$\log\left(\frac{2^p}{N_B}(R-Y)\right) = p + n + 1.$$

The inverse transformations to transform the processed image colour data (e.g. output by the processing units $204_{1,2,\ldots,n}$) back to an RGB colour space are:

$$R \leftarrow \max(\min((\widetilde{Cr}\ Y)k_R^{-1} + Y, 2^n - 1), 0) \tag{30}$$

$$B \leftarrow \max(\min((\widetilde{Cb}\ Y)k_B^{-1} + Y, 2^n - 1), 0) \tag{31}$$

$$G \leftarrow \max(\min((Y2^o - k_R R - k_B B + k_G 2^{-1})k_G^{-1}, 2^n - 1), 0) \tag{32}$$

Thus, a transformation unit (e.g. the second transformation unit 206) may operate to transform processed image data in integer format back to the RGB colour space using the transformations specified in equations (30) to (32).

In another arrangement, the image processor 200 (and in particular the transformation unit 202) may be configured to transform the colour data of the input image into the luminance-normalised colour space YCbCr/Y using the set of transformation parameters $k_R=k_G=k_R=1$, $N_r=N_b=1$, $o=1$. In this case, the transformation unit 202 may apply the following fixed-point transformations to the input colour data:

$$Y \leftarrow 2^{-1}(R+G+B+1) \tag{34}$$

$$\widetilde{Cr} \leftarrow \frac{2^p(R-Y)}{Y} \tag{35}$$

$$\widetilde{Cb} \leftarrow \frac{2^p(B-Y)}{Y} \tag{36}$$

In this implementation, the value ranges are simplified to:

$$Y \in [0, 1.5(2^n-1)] \tag{37}$$

$$\widetilde{Cr}, \widetilde{Cb} \in [-2^p, 2^p] \tag{38}$$

It is noted that the range of chrominance values in this implementation may be particularly well-suited to normalised integer data types supported by certain types of hardware.

Considering the chrominance resolution in this simplified implementation, we again set $Y=2^n$ and B or $R=Y-1=2^n-1$, in which case the chrominance transformation becomes:

$$C \leftarrow -2^p 2^{-n} \tag{39}$$

where $C = \widetilde{Cr}$ or $\widetilde{Cb}$.

In order for the chrominance value to be non-zero in integer arithmetic, it follows that:

$$2^p \geq 2^n \tag{40}$$

$$\therefore p \geq n \tag{41}$$

Using equation (38), the output precision m for the chrominance values can be specified as:

$$m = \log_2 2^p + 1 = p+1 \tag{42}$$

Using equation (41), the output precision m can therefore be set to $m=n+1$ (it is noted that the '+1' accounts for the sign bit.). Thus, this implementation enables the output precision to be reduced compared to the more general implementation described above (where $m \geq n+6$).

Under this implementation, the transformation from YCbCr/Y to RGB can be written as:

$$R \leftarrow \max(\min((\widetilde{Cr} \; Y)2^{-p}+Y,2^n-1),0) \tag{43}$$

$$B \leftarrow \max(\min((\widetilde{Cb} \; Y)2^{-p}+Y,2^n-1),0) \tag{44}$$

$$G \leftarrow \max(\min((2Y-R-B),2^n-1),0) \tag{45}$$

Thus, transformation unit 206 may be adapted to transform processed image colour data in integer format to an RGB colour space using the transformations specified in equations (43) to (45).

Setting the transformation constants equal to unity may not relate to any broadcast standard such as ITU-R. However, adapting the transformation unit 202 (and optionally transformation unit 206) to use transformation constants equal to unity may be useful for implementations of the image processor 200 to image processing and/or computer vision, due to the reduced output precision compared to the more general implementation described above.

In the above examples, the input colour data received at the image processor 200 is RGB colour data that is transformed to the luminance-normalised YCbCr colour space YCbCr/Y. It will be appreciated that the input colour data may be expressed in other types of colour spaces, for example YCbCr, YUV, CMYK etc. Furthermore, the luminance-normalised colour space need not be YCbCr/Y (or Y'CbCr/Y') but could be some other type of luminance-chrominance colour space (i.e. some other type of colour space which comprises a luminance component and one or more luminance-normalised chrominance components). For example, the luminance-normalised colour space could be YUV/Y having components Y, U/Y, V/Y.

In the examples described herein, the steps of transforming the colour data to the luminance-normalised colour space, performing the processing operations on the transformed colour data, and transforming the processed data to a further colour space are performed by a single image processor device. In other examples, these steps may be distributed across multiple processing devices, e.g. two processor devices.

Figure 9:
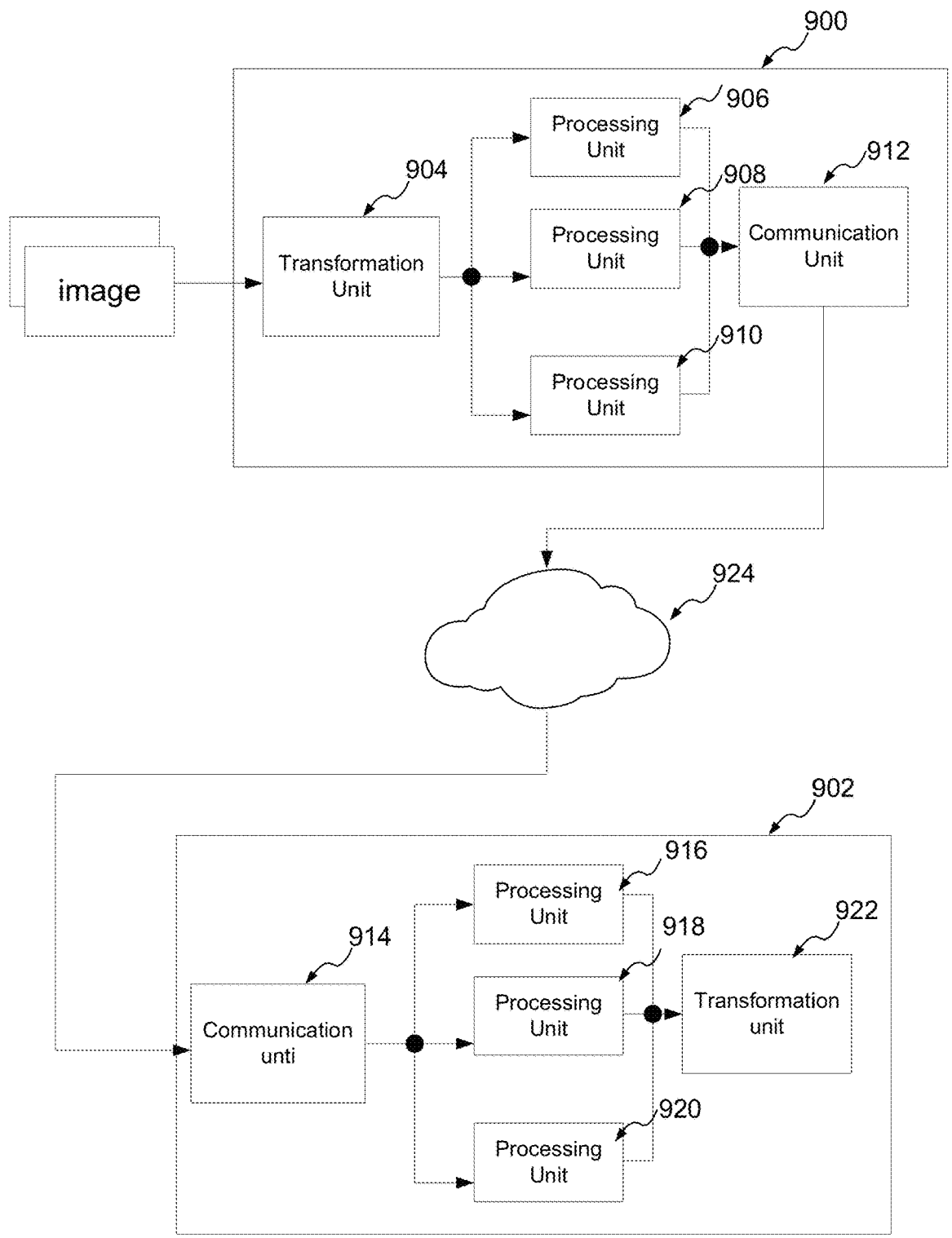
FIG. 9 shows an example of two image processors for performing image processing operations on image colour data expressed in a luminance-normalised colour space that can communicate over a communication network.

FIG. 9 shows two processor devices 900 and 902 configured to communicate over a communication network 924. Network 924 could be wired and/or wireless network. Device 900 comprises transformation unit 904; one or more processing units (in this example, three processing units 906, 908, 910); and a communication unit 912.

Device 902 comprises communication unit 914; one or more processing units (in this example, three processing units 916, 918, 920); and a transformation unit 922.

Transformation unit 904 is configured to transform the colour data for the image to a luminance-normalised colour space (e.g. as described above with reference to step 304). The one or more processing units 906-910 perform one or more image processing operations on the transformed colour data to generate processed image data (e.g. as described above with reference to step 306). In one example, the one or more processing operations comprises compressing the transformed colour data. A processing unit could for instance perform chroma sub-sampling on the transformed colour data to reduce the resolution of the chrominance data. The compressed transformed colour data could then be communicated from device 900 to device 902 over network 924 using communication unit 912. Communication unit 912 could for example be a transmitter, or transceiver.

The processed transformed colour data is received at device 902 by communication unit 914. Communication unit 914 could for example by a receiver, or transceiver. The one or more processing units 916-920 may perform one or more additional processing operations on the received transformed data to generate further processed data. The one or more additional processing operations may comprise—if the transformed image data was compressed by device 900—decompressing the received data, for example to reconstruct the transformed image data having full chroma resolution (i.e. the chrominance data is reconstructed to its full resolution). Transformation block 922 transforms processed image data to a further image colour space (e.g. as described above with reference to step 308).

In other examples, device 900 may not include any processing units (i.e., all processing of the transformed image data may be performed by device 902); alternatively, device 902 may not include any processing units (i.e., all processing of the transformed image data may be performed by device 900).

The image processor 200 and processing units $204_{1,2...n}$ of FIGS. 2, 5-6 and 9 are shown as comprising a number of functional blocks. This is schematic only and is not intended to define a strict division between different logic elements of such entities. Each functional block may be provided in any suitable manner. It is to be understood that intermediate values described herein as being formed by a unit need not be physically generated by the unit at any point and may merely represent logical values which conveniently describe the processing performed by the unit between its input and output.

The image processors described herein may be embodied in hardware on an integrated circuit. The image processors described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an image processor configured to perform any of the methods described herein, or to manufacture an image processor comprising any apparatus described herein. An integrated circuit definition dataset may be, for example, an integrated circuit description.

There may be provided a method of manufacturing, at an integrated circuit manufacturing system, an image processor as described herein. There may be provided an integrated circuit definition dataset that, when processed in an integrated circuit manufacturing system, causes the method of manufacturing an image processor to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (®) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an image processor will now be described with respect to FIG. 9.

Figure 10:
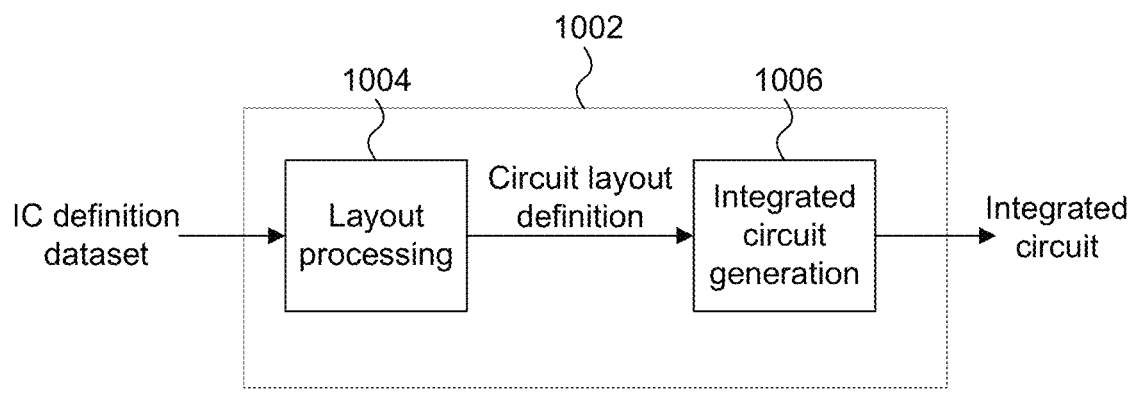
FIG. 10 is a schematic diagram of an integrated circuit manufacturing system.

FIG. 10 shows an example of an integrated circuit (IC) manufacturing system 1002 which is configured to manufacture an image processor as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining an image processor as described in any of the examples herein), process the IC definition dataset, and generate an IC according to the IC definition dataset (e.g. which embodies an image processor as described in any of the examples herein). The processing of the IC definition dataset configures the IC manufacturing system 1002 to manufacture an integrated circuit embodying an image processor as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an image processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. An apparatus for processing image data for an image, wherein the image data comprises colour data expressed in a first colour space, the apparatus comprising:
 a transformation unit configured to transform the colour data expressed in the first colour space to transformed colour data expressed in a lum inance-normalised colour space comprising a luminance component, a first luminance-normalised chrominance component and a second luminance-normalised chrominance component; and
 one or more processing units configured to perform one or more processing operations on the transformed colour data expressed in the luminance-normalised colour space to generate processed image data, wherein the one or more processing units comprises a correction unit configured to apply a gamma correction to the luminance component of the transformed colour data.

2. An apparatus as claimed in claim 1, wherein the apparatus further comprises a second transformation unit configured to transform the processed image data to the first colour space.

3. An apparatus as claimed in claim 1, wherein the chrominance components are dependent on the luminance.

4. An apparatus as claimed in claim 1, wherein the luminance-normalised colour space is a luminance-normalised version of a YCbCr colour space.

5. An apparatus as claimed in claim 1, wherein the luminance-normalised colour space has components:

$$Y = K_R R + K_g G + K_B B; \tilde{Cr} = \frac{R-Y}{YN_R}; \tilde{Cb} = \frac{B-Y}{YN_B},$$

where R, G and B are red, green and blue colour components respectively, Y is the luminance component, $\tilde{Cr}$ and $\tilde{Cb}$ are luminance-normalised chrominance components and $K_R$, $K_g$, $K_R$ and $N_B$ are constants.

6. An apparatus as claimed in claim 1, wherein the luminance-normalised colour space has components:

$$Y' = K_R R' + K_g G' + K_B B'; \hat{C}r = \frac{R' - Y'}{Y' N_R}; \hat{C}b = \frac{B' - Y'}{Y' N_B},$$

where R', G' and B' are gamma-corrected red, green and blue colour components respectively, Y' is the gamma-corrected luminance, $\widetilde{Cr}$ and $\widetilde{Cb}$ are luminance-normalised chrominances and $K_R$, $K_g$, $K_B$, $N_R$ and $N_B$ are constants.

7. An apparatus as claimed in claim 1, wherein the colour data is expressed in an RGB colour space and is in fixed point format, and the transformation unit is configured to apply one of the following transformations to the colour data to transform the colour data to the luminance-normalised colour space:

$$Y \leftarrow (k_R R + k_G G + k_B B + 2^{o-1})2^{-o} \quad (1)$$
$$\widetilde{C_r} \leftarrow (l_R(R - Y))Y^{-1}$$
$$\widetilde{C_b} \leftarrow (l_B(B - Y))Y^{-1}$$

where $k_R = \text{int}(2^o K_R)$, $k_G = \text{int}(2^o K_G)$, $k_B = 2^o - k_R - k_G$, $l_R = \text{int}\left(\frac{2^p}{N_r}\right)$, $l_B = \text{int}\left(\frac{2^p}{N_b}\right)$ and o and p are specified integer values; or $$Y' \leftarrow (k_R R' + k_G G' + k_B B' + 2^{o-1})2^{-o} \quad (2)$$
$$\widetilde{C_r} \leftarrow (l_R(R' - Y'))Y^{-1}$$
$$\widetilde{C_b} \leftarrow (l_B(B' - Y'))Y^{-1}$$

where $k_R = \text{int}(2^o K_R)$, $k_G = \text{int}(2^o K_G)$, $k_B = 2^o - k_R - k_G$, $l_R = \text{int}\left(\frac{2^p}{N_r}\right)$, $l_B = \text{int}\left(\frac{2^p}{N_b}\right)$;

o and p are specified integer values; and R' G' and B' are gamma-corrected red, green and blue colour components respectively.

8. An apparatus as claimed in claim 7, wherein the colour data comprises a set of n-bit RGB colour values, and the transformed colour data comprises a set of colour values each having $\widetilde{C_r}$ and $\widetilde{C_b}$ values, the transformation unit being configured to output m-bit $\widetilde{C_r}$ and $\widetilde{C_b}$ values, where m≥n.

9. An apparatus as claimed in claim 8, wherein m≥n+6.

10. An apparatus as claimed in claim 7, wherein $k_R = k_G = 1$, $N_r = N_b = 1$, o=1.

11. An apparatus as claimed in claim 10, wherein the colour data comprises a set of n-bit RGB colour values, and the transformed colour data comprises a set of colour values each having $\widetilde{C_r}$ and $\widetilde{C_b}$ values, the transformation unit being configured to output m-bit $\widetilde{C_r}$ and $\widetilde{C_b}$ values, where m=n+1.

12. An apparatus as claimed in claim 1, wherein the one or more processing units comprises a filtering unit configured to filter luminance-normalised chrominance channels of the transformed colour data.

13. An apparatus as claimed in claim 1, wherein at least one of the one or more processing units is configured to perform a processing operation comprising determining a median value of a plurality of luminance-normalised chrominance values of pixels within a kernel.

14. An apparatus as claimed claim 1, wherein the transformation unit is configured to perform a division operation to divide one or more chrominance values for a pixel by a luminance value for the pixel as part of transforming the colour data to a luminance-normalised colour space.

15. An apparatus as claimed in claim 14, wherein the transformation unit is configured to implement the division operation using a CORDIC algorithm, the transformation unit being configured to determine the number of iterations of the CORDIC algorithm based on the range of possible luminance-normalised chrominance values in the luminance-normalised colour space.

16. A method of processing image data for an image in an image processor, the method comprising:
  receiving the image data, wherein the image data comprises colour data expressed in a first colour space;
  transforming the colour data expressed in the first colour space to transformed colour data expressed in a luminance-normalised colour space comprising a luminance component, a first luminance-normalised chrominance component and a second luminance-normalised chrominance component; and
  performing one or more image processing operations on the transformed colour data expressed in the luminance-normalised colour space to generate processed image data, comprising applying a gamma correction to the luminance component of the transformed colour data.

17. A method as claimed in claim 16, wherein the method further comprises transforming the processed image data to the first colour space.

18. A method as claimed in claim 16, wherein the chrominance components are dependent on the luminance.

19. A non-transitory computer readable storage medium having stored thereon computer readable instructions that, when executed at a computer system, cause the computer system to perform a method of processing image data for an image, comprising:
  receiving the image data, wherein the image data comprises colour data expressed in a first colour space;
  transforming the colour data expressed in the first colour space to transformed colour data expressed in a luminance-normalised colour space comprising a luminance component, a first luminance-normalised chrominance component and a second luminance-normalised chrominance component; and
  performing one or more image processing operations on the transformed colour data expressed in the luminance-normalised colour space to generate processed image data, comprising applying a gamma correction to the luminance component of the transformed colour data.

* * * * *

UNITED STATES PATENT AND TRADEMARK OFFICE
CERTIFICATE OF CORRECTION

PATENT NO. : 11,574,387 B2
APPLICATION NO. : 16/118927
DATED : February 7, 2023
INVENTOR(S) : Ruan Lakemond and Fabian Angarita It is certified that error appears in the above-identified patent and that said Letters Patent is hereby corrected as shown below:

In the Claims

Claim 5, Column 24, Lines 64-65:
$K_R$, $K_g$, $K_R$ and $N_B$

Should be:
$K_R$, $K_g$, $K_B$, $N_R$ and $N_B$

Claim 10, Column 25, Line 64:
$k_R = k_G = 1$,

Should be:
$k_R = k_G = k_B = 1$,

Signed and Sealed this
Second Day of May, 2023

Katherine Kelly Vidal
*Director of the United States Patent and Trademark Office*